United States Patent [19]

Furuno

[11] Patent Number: 5,164,080
[45] Date of Patent: Nov. 17, 1992

[54] ION-EXCHANGE TREATMENT APPARATUS FOR DISPERSIONS

[75] Inventor: Nobuo Furuno, Amagasaki, Japan

[73] Assignee: Fine Clay Co., Ltd., Japan

[21] Appl. No.: 722,460

[22] Filed: Jun. 27, 1991

[30] Foreign Application Priority Data

Jun. 28, 1990 [JP] Japan .................................. 2-170864

[51] Int. Cl.$^5$ .............................................. C02F 1/42
[52] U.S. Cl. .................................. 210/195.1; 210/196; 210/259; 210/266; 210/900; 210/265
[58] Field of Search ............... 210/259, 266, 900, 167, 210/195.1, 196, 265

[56] References Cited

U.S. PATENT DOCUMENTS

| 3,276,458 | 10/1966 | Iversen et al. | 210/258 |
| 3,444,079 | 5/1969 | Bowers | 210/259 |
| 4,098,697 | 7/1978 | DeAngelis | 210/266 |
| 4,105,556 | 8/1978 | D'Amaddio | 210/259 |
| 4,276,177 | 6/1981 | Smith | 210/259 |
| 4,374,028 | 2/1983 | Medina | 210/665 |
| 4,610,790 | 9/1986 | Reti et al. | 210/259 |
| 4,655,969 | 4/1987 | Furuno | 210/266 |
| 4,698,153 | 10/1987 | Matsuzaki et al. | 210/900 |
| 4,787,980 | 11/1988 | Ackermann et al. | 210/652 |
| 5,061,374 | 10/1991 | Lewis | 210/266 |
| 5,069,783 | 12/1991 | Wang et al. | 210/196 |

FOREIGN PATENT DOCUMENTS

| 57-149805 | 6/1982 | Japan . | |
| 59-92028 | 5/1984 | Japan . | |
| 60-132693 | 7/1985 | Japan . | |
| 3036899 | 2/1988 | Japan | 210/259 |

Primary Examiner—Stanley S. Silverman
Assistant Examiner—Cynthia L. Nessler
Attorney, Agent, or Firm—Lowe, Price, LeBlanc & Becker

[57] ABSTRACT

Disclosed herein is an ion-exchange treatment apparatus for dispersions, which comprises (1) a main circuit including (a) a first separation means for separating coarse particles among dispersoids from a raw dispersion supplied thereto, (b) an ion-exchange treatment column containing a particulate ion-exchange resin having a single polarity, (c) a second separation means for separating the remaining dispersoids from the dispersion subjected to the ion-exchange treatment and (d) a flow path line for causing the means (a), (b) and (c) to communicate in series, and (2) a circulating circuit for returning at least part of the dispersion treated in the second separation means (c) to the first separation means (a). Another apparatus in which at least one combination of a separation means and an ion-exchange treatment column containing a particulate ion-exchange resin having a single polarity is arranged further in the main circuit is also disclosed.

16 Claims, 4 Drawing Sheets

ION-EXCHANGE TREATMENT APPARATUS FOR DISPERSIONS

BACKGROUND OF THE INVENTION

1) Field of the Invention

The present invention relates to an apparatus capable of effectively performing an ion-exchange treatment of dispersions (hereinafter may called suspensions), more specifically to an apparatus capable of carrying out an ion-exchange treatment of dispersions and liquids generating dispersoids to ensure the collection of their corresponding deionized dispersion and dispersion media, and separating and collecting the dispersoids thereof as valuable acidic fine particles and/or basic fine particles.

2) Description of the Related Art

Since a fixed bed of a particulate ion-exchange resin, which has been filled in an ion-exchange column, traps suspensoids (suspended particles), it is difficult to subject any suspensions and liquids generating suspensoids to an ion-exchange treatment. It is an usual method to treat a suspension by ultrafiltration in advance to remove its suspensoids and then to ion-exchange the thus-treated suspension. However, the limited pH value of a suspension to be treated is required to permit its ultrafiltration. The pH must hence be adjusted by addition of an acidic or basic substance prior to the ultrafiltration. As a result, the concentration of electrolytic ions in the resultant filtrate is increased.

Figure 3:
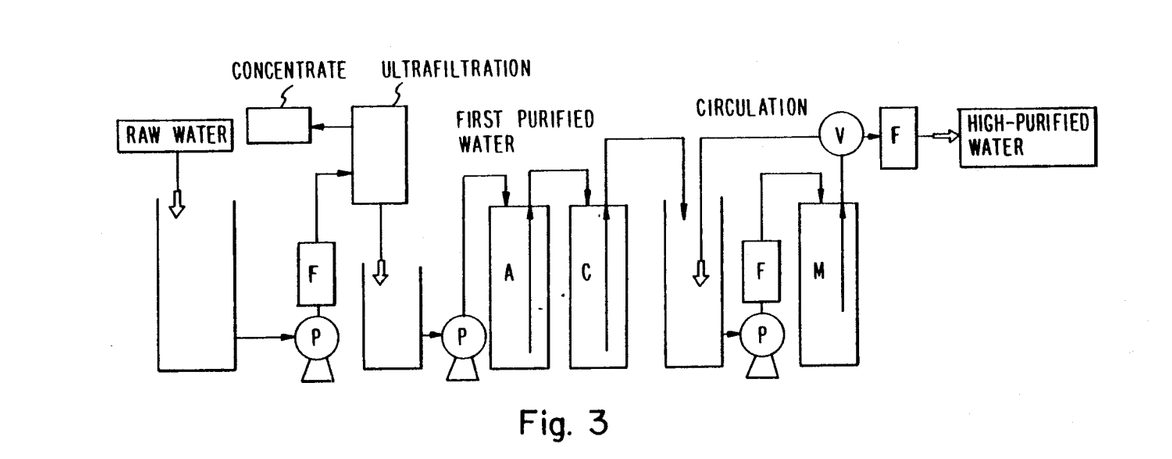
FIG. 3 is a flow chart illustrating a conventional water-purifying apparatus in which a suspension medium is collected and recovered from a suspension.

In FIG. 3, is illustrated a circuit of a conventional deionizing and purifying apparatus for water, which is intended to remove the suspensoids from a suspension, thereby obtaining a purified suspension medium such as deionized water. Before and after an ion-exchange treatment column A (anion-exchange resin column) and an ion-exchange treatment column C (cation-exchange resin column), there are provided for use various kinds of filters F including an ultrafilter in plural stages. Since their filters trap suspensoids without regard for their chemical properties (for example, acid or base), it is impossible to classify the suspensoids by their chemical properties to separate and recover them. Therefore, the suspensoids trapped are discarded together with filter media in general.

Figure 4:
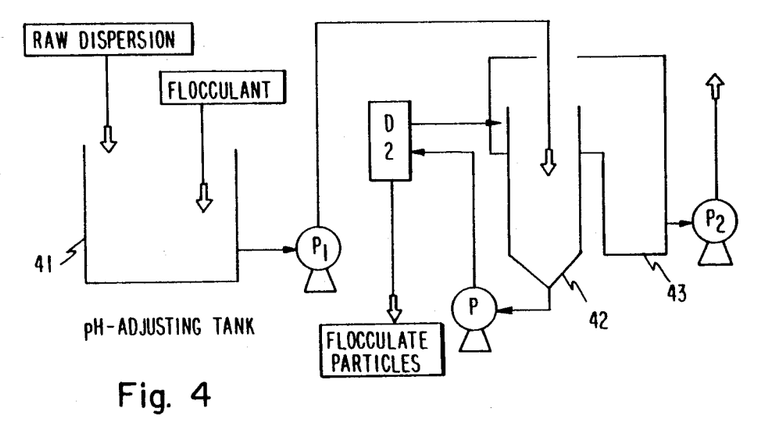
FIG. 4 is a flow chart illustrating a conventional effluent-treating apparatus in which suspensoids are collected and recovered from a suspension.

FIG. 4 illustrates a flow chart of a conventional effluent treatment by which suspensoids are collected and recovered from a suspension. A flocculant (electrolyte) is added to a suspension (effluent), suspensoids are flocculated and settled in a settling separator 42 to separate them, and a supernatant liquid was then recovered through an overflow tank 43. It is impossible to obtain purified suspension medium and suspensoids due to the addition of the flocculant. The suspensoids can also be not classified by their chemical properties.

In order to enhance the level of deionization, it is essential to use a mix bed system in which both anion-exchange and cation-exchange resins are mixed with each other or to preset a particular circulation circuit (Japanese Patent Publication No. 59793/1986). According to the conventional ion-exchange treatment, it is possible to prepare deionized and purified water. It is however impossible to usefully use suspensoids contained in a suspension.

It is disclosed in Japanese Patent Application Laid-Open No. 149805/1982 to subject various kinds of functional fine particles including pigments to an ion-exchange treatment in order to remove electrolytes remaining in the fine particles. Such a method has not come to be used in industry because there is no specific treatment means or apparatus which is industrially practicable.

In order to carry out an ion-exchange treatment of a suspension without any clogging, it has been proposed to cause the suspension to pass through an ion-exchange resin layer upward so as for the resin not to accumulate (Japanese Patent Application Laid-Open No. 92028/1984). In order to suspend and fluidize the ion-exchange resin in this method, however, a large space provided with a special device therein is required, a pump having a high lift for passage of the suspension must be selected, and excess energy is also required, in comparison with downward passage of the suspension, by which the ion-exchange resin is left at rest. In addition, such a method does not always prevent clogging in an ion-exchange treatment of a suspension liable to flocculate. It is therefore difficult to use such a method on an industrial scale.

OBJECT AND SUMMARY OF THE INVENTION

It is an object of the present invention to provide an apparatus capable of effectively and highly performing an ion-exchange treatment of dispersions or suspensions, said treatment having been difficult to date, and of recovering a purified dispersion medium and separating and recovering dispersoids having physically and chemically identical properties.

In order to perform the ion-exchange treatment to a high degree, it is preferable to make the flow velocity (space velocity) of a dispersion to the amount of an ion-exchange resin filled smaller. Such a velocity is liable to form a cause of clogging because particles dispersed in the dispersion settle in an ion-exchange treatment column. In general, a fixed bed of a particulate ion-exchange resin having a particle size of several millimeters is formed in the ion-exchange treatment column. The dispersion to be treated passes through interparticle spaces of the ion-exchange resin. Therefore, it is preferable to make the flow velocity of the dispersion greater so as for the fixed bed not to clog. Such a velocity however makes an ion-exchange reaction insufficient.

With the foregoing in view, the present inventor has carried out an extensive investigation. As a result, it has been found that the above-described object can be achieved by providing a first separation means for separating and removing coarse particles in a dispersion in advance, said coarse particles forming a cause of clogging in an ion-exchange treatment column, thereby separating and removing the coarse particles, causing the thus-treated dispersion to pass through an ion-exchange treatment column containing a particulate ion-exchange resin having a single polarity to subject the dispersion to an ion-exchange treatment while making the flow rate of the dispersion to be treated to the ion-exchange resin in the ion-exchange treatment column great, thereby preventing clogging, and then feeding the dispersion thus treated into a second separation means for separating dispersoids from the dispersion subjected to the ion-exchange treatment, and at this time constructing a circulating circuit for returning at least part of the dispersion treated in the second separation means to the first separation means, thereby subjecting the dispersion to the ion-exchange treatment repeatedly if the ion-exchange treatment becomes insufficient due to the high-speed treatment operation.

It has also been found that even when a dispersion becomes liable to flocculate and dispersoids liable to flocculate are generated when it is subjected to an ion-exchange treatment, or a liquid which undergoes clogging in a conventional ion-exchange treatment column to become untreatable is treated, clogging does not occur so long as the ion-exchange treatment is conducted while continuously separating and removing dispersoids settled in the second separation means.

In addition, It has been found that when an ultrafiltering means and/or an ion-exchange treatment column containing a particulate ion-exchange resin having a polarity opposite to that of the ion-exchange resin used in the main circuit are arranged in the course of the circulating circuit, it is possible to obtain a dispersion medium highly deionized and acidic fine particles o basic fine particles which have been purified and classified. Moreover, it has been found that when an anion-exchange treatment column and a cation-exchange treatment column are also disposed in series in the main circuit, it is possible to obtain a dispersion medium highly deionized and acidic fine particles or basic fine particles which have been purified and classified.

Further, it has been found that when a number of combinations of a separation means and an ion-exchange treatment column containing a particulate ion-exchange resin having a single polarity are arranged in the main circuit, the ion-exchange capacity can be increased.

The present invention has been led to completion on the basis of these findings.

In one aspect of the present invention, there is thus provided an ion-exchange treatment apparatus for dispersions, which comprises (1) a main circuit including (a) a first separation means for separating coarse particles among dispersoids from a raw dispersion supplied thereto, (b) an ion-exchange treatment column containing a particulate ion-exchange resin having a single polarity, (c) a second separation means for separating the remaining dispersoids from the dispersion subjected to the ion-exchange treatment and (d) a flow path line for causing the means (a), (b) and (c) to communicate in series, and (2) a circulating circuit for returning at least part of the dispersion treated in the second separation means (c) to the first separation means (a).

In another aspect of the present invention, there is also provided an ion-exchange treatment apparatus for dispersions, which comprises (I) a main circuit including (A) a first separation means for separating coarse particles among dispersoids from a raw dispersion supplied thereto, (B) a first ion-exchange treatment column containing a particulate ion-exchange resin having a single polarity, (C) a second separation means for separating certain dispersoids from the dispersion subjected to the ion-exchange treatment in the first ion-exchange treatment column (B), (D) a second ion-exchange treatment column containing a particulate ion-exchange resin having a polarity opposite to that of the ion-exchange resin in the first column (B), (E) a third separation means for separating the remaining dispersoids from the dispersion subjected to the ion-exchange treatment in the second ion-exchange treatment column (D) and (F) a flow path line for causing the means (A), (B), (C), (D) and (E) to communicate in series, and (II) a circulating circuit for returning at least part of the dispersion treated in the third separation means (E) to the first separation means (A).

According to the present invention, coarse particles of the dispersoids are surely removed by settling prior to the ion-exchange treatment of a dispersion, and the dispersion is caused to pass through the ion-exchange treatment column at a speed as high as possible. It has hence been possible to treat the dispersion in a large amount without any clogging.

In the ion-exchange treatment, even when the amount of the dispersion passing through the ion-exchange means is made greater, so that the treatment becomes insufficient, the circulating circuit comprising a return line provided between the settling separators disposed before and after the ion-exchange means permits increase of the number of treatments, resulting in a complete ion-exchange treatment.

In the high-speed ion-exchange treatment, monovalent ions are removed more selectively than divalent and trivalent ions. Such a treatment can hence exhibit, for example, an advantageous phenomenon that monovalent anions, chlorine ions and monovalent cations, sodium ions, which cause corrosion of metals, can be efficiently removed before other ions.

Since dispersoids can be recovered by separating basic fine particles and acidic fine particles from the dispersion in the respective separation means after the treatments with the anion-exchange resin and the cation-exchange resin, they can be put to a good use.

Dispersoids failing to be settled by said both separation means can be subjected to an ultrafiltration whose enrichment ratio is enhanced as much as possible to recover them through an outlet for an concentrate in an ultrafilter. This concentrate comprises neutral fine particles with both acidic and basic fine particle removed therefrom and/or fine particles composed of amphoteric polymers. As described above, the apparatus according to the present invention is characterized in that these fine particles can be recovered in a pure form.

Since the pH of the dispersion can be adjusted so as to decrease its ion concentration, the efficiency of the ultrafiltration can be improved to stably collect a clean filtrate in a large amount.

Since the anion-exchange and cation-exchange treatment columns are arranged in series and a circulating circuit is provided, thereby treating a dispersion at high speed, it is also possible to highly deionize and purify the dispersion.

Other objects, features and advantages of the present invention will become apparent from the following description and the appended claims, taken in conjunction with the accompanying drawings.

DETAILED DESCRIPTION OF THE INVENTION

Features of the present invention will hereinafter be described in detail.

Dispersion

The term "dispersion (raw dispersion) to be treated" as used herein means a liquid in which particles having a particle size of several microns are principally dispersed as dispersoids, and turbidity is observed The degree of turbidity is not only observed with the naked eye, but also identified by an optical analysis. Therefore, the dispersion includes those called a cloudy suspension, colloidal solution, emulsion and the like. The dispersion medium is composed principally of water, but may contain at least one hydrophilic solvent such as alcohol. Any substances may be contained as dispersoids irrespective of organic, inorganic, natural or synthetic substances.

The raw dispersions or suspensions applied to the present invention are various kinds of dispersions or suspensions in the natural environment and various kinds of industries. These dispersions or suspensions are treated with a view toward enhancing their value and recovering invaluable suspensoids and suspension media.

As specific examples of the application of the apparatus according to the present invention, may be mentioned:

(1) collection of purified water and recovery of suspensoids from natural river water containing the suspensoids;

(2) recovery of valuable suspensoids from effluents of mine, civil work, gravel washing, etc.;

(3) recovery of valuable suspensoids from an effluent upon washing quartz sand used in sandblasting and as a foundry mold material;

(4) washing process in the preparation of finely particulate pigments composed of a metal oxide such as aluminum oxide, titanium oxide, manganese oxide, iron oxide, copper oxide or zinc oxide, and various kinds of other finely particulate pigments; and (5) an apparatus for treating a colloidal aqueous dispersion, cloudy suspension, aqueous dispersion of a polymer, which is called an "emulsion", or fine dispersion of a gelatinized polymer in various kinds of industries, for example, an apparatus for electrodeposition coating, by which an electrodeposition coating solution, namely, a diluted water paint can be purified in situ to permit good electrodeposition coating, or an apparatus for preparing purified paints.

Problems common in the above-described treatments of the dispersions or suspensions are to adjust their pH without increasing their ion concentrations and to classify the dispersoids or suspensoids chemically (acid or base) and physically (shape and the like). Upon the pH adjustment for flocculation of suspensoids in a suspension, deflocculation of flocculates or the like, a method in which anions contained in the suspension are exchanged for $OH^-$ ions to raise its pH, or cations contained in the suspension are exchanged for $H^+$ ions to lower its pH is more effective than the conventional method in which an acidic substance or a basic substance is added to the suspension. There has been a demand for the development of an apparatus capable of reliably performing such a method.

Ion-exchange treatment apparatus

The ion-exchange treatment apparatus according to the present invention will hereinafter be described with reference to the accompanying drawings.

Figure 1:
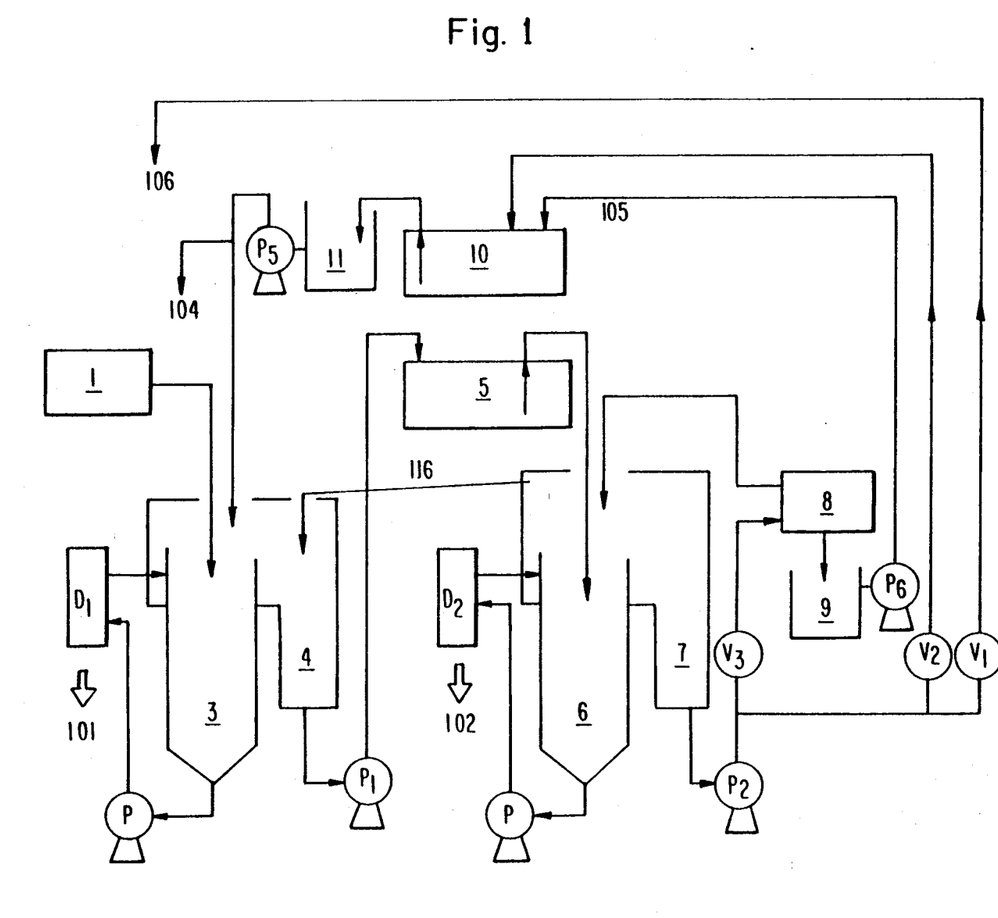
FIGS. 1 and 2 are flow charts illustrating ion-exchange treatment apparatus according to the present invention.

FIG. 1 is a flow chart illustrating one embodiment making use of one ion-exchange treatment column, in which a particulate ion-exchange resin having a single polarity is contained, in a main circuit.

A tank 3 is a settling separator for separating coarse particles from a raw dispersion 1 supplied thereto, and is provided with a continuous centrifugal separator D1. The continuous centrifugal separator D1 serves to subject the dispersion taken out from the bottom of the settling separator to a centrifuging treatment. A light liquid from the centrifugal separator D1 is returned to the tank 3, and a heavy medium therefrom is once removed through an outlet 101 and then ground to return to the tank 3, or is discarded. The tank 3 is also provided with a snubber 4. The first separation means is constructed by these equipments. The tank 3 is monitored in such a manner that the supply of the raw dispersion 1 is started automatically and then stopped automatically until the tank 3 is filled with the raw dispersion 1. The raw dispersion 1 is supplied in an amount enough to supplement the treated dispersion taken out of the tank 3.

As a measure of separation in the first separation means, a method in which dispersoids corresponding to a Stokes diameter greater than 10 $\mu$m, preferably 6 $\mu$m, such a diameter forming a cause of clogging in an ion-exchange treatment column, are taken out through the outlet 101 is suitable. This value is a value in the case where the particle size of the ion-exchange resin particles is of the order of several millimeters. As the particle size of the ion-exchange resin becomes greater, it is possible to treat dispersoids greater correspondingly.

The dispersion overflowed from the tank 3 is fed to the ion-exchange treatment column 5 through the snubber 4 by a pump $P_1$. In general, a magnet pump fabricated by a soft material is used. The dispersion is introduced into the ion-exchange treatment column 5 and then the second settling means 6 through a pressure hose of a flexible structure. The pump $P_1$ is controlled so as to stop automatically when the snubber 4 is emptied However, a snubber large enough for the pump not to stop in a usual operation is provided.

The ion-exchange treatment column 5 contains therein a particular ion-exchange resin having a single polarity, for example, an H-type cation-exchange resin or OH-type anion-exchange resin. In this invention, the flow rate of the dispersion to be treated (space velocity) to the ion-exchange resin in the ion-exchange treatment column is made great, thereby preventing clogging caused by the trapping of dispersoids (dispersed particles) in the layer of the particulate ion-exchange resin. It is preferable to use an ion-exchange resin great in particle size.

The dispersion subjected to the ion-exchange treatment is introduced into a tank 6. The tank 6 is a settling separator provided with both continuous centrifugal separator D2 and snubber 7. As a result that the pH of the dispersion has been changed by the ion-exchange treatment, a portion of the dispersoids flocculates and settles according to its chemical property For example, when the pH is lowered to 6 or lower by the ion-exchange treatment with the H-type cation-exchange resin, acidic particles in the dispersion flocculate. When the pH is raised to 8 or higher by the ion-exchange treatment with the OH-type anion-exchange resin on the other hand, basic particles in the dispersion flocculate.

In the tank 6, a sufficient residence time is given to leave the dispersion at rest, thereby settling the flocculated dispersoids. A return circuit line 116 to return a supernatant liquid to the snubber 4 by gravity-flow is provided to perform the ion-exchange treatment repeatedly, thereby causing the ion-exchange reaction to progress. In the continuous centrifugal separator D2, the dispersion taken out from the bottom of the tank is subjected to a centrifuging treatment. A light liquid from the centrifugal separator D2 is returned to the tank 6, and a heavy medium therefrom is removed through an outlet 102. The second separation means is constructed by these equipments.

The supernatant liquid overflowed from the tank 6 is recycled to the tank 3 through the snubber 7 via a valve $V_1$ by a pump $P_2$, whereby the dispersion containing dispersoids unsettled can be subjected to the ion-exchange treatment repeatedly. Alternatively, the supernatant liquid may be discharged through an outlet 106 to use it as a clear liquid.

Besides, when an ion-exchange treatment column 10 containing a particulate ion-exchange resin having a polarity opposite to that of the ion-exchange resin used in the main circuit is provided in the course of a circulating circuit through which a portion of the overflow stream from the second separation means is returned to the first separation means via a valve $V_2$ so as to ion-exchange ions having a polarity opposite to those ion-exchanged in the main circuit, the deionizing reaction of the dispersion can be caused to progress to obtain a dispersion medium more highly purified. The thus-purified dispersion medium is taken out through an outlet 104 via a tank 11 and a pump $P_5$.

An ultrafiltering means 8 is provided in the circulating circuit to ultrafilter at least part of the overflow stream from the second separation means via a valve $V_3$. Its concentrate is returned to the second separation means, while its filtrate is taken out as a clear dispersion medium via a tank 9 and a pump $P_6$. The filtrate is subjected further to an ion-exchange treatment, whereby a dispersion medium more highly purified can be taken out through the outlet 104.

Incidentally, although the apparatus provided with one ion-exchange resin column in the main circuit has been illustrated in FIG. 1, at least one combination of a separation means and an ion-exchange treatment column containing a particulate ion-exchange resin having a single polarity may be further arranged so as to communicate in series by a flow path line.

Figure 2:
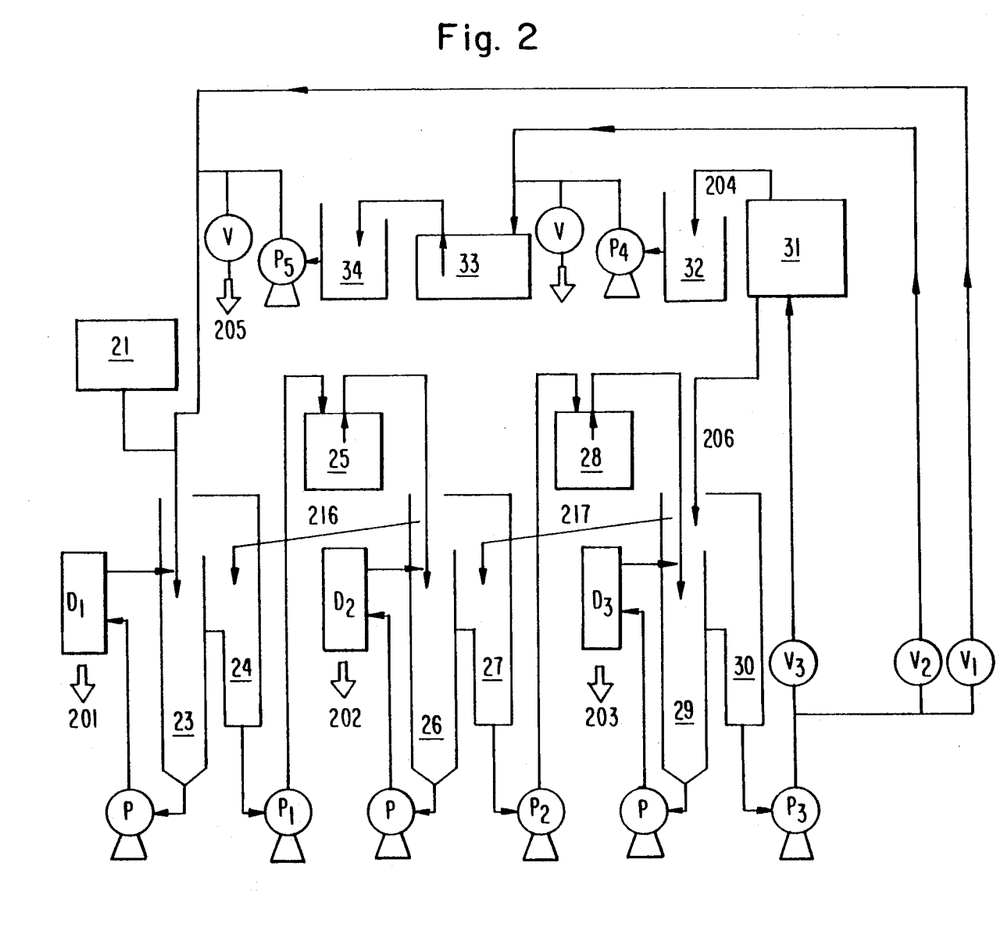

FIG. 2 is a flow chart illustrating an ion-exchange treatment apparatus according to another embodiment of this invention and having a structure that a first ion-exchange treatment column (for example, anion-exchange treatment column) containing a particulate ion-exchange resin having a single polarity and a second ion-exchange treatment column (for example, cation-exchange treatment column) containing a particulate ion-exchange resin having a polarity opposite to that of the ion-exchange resin in the first column are arranged in series.

Tanks 23, 26, 29, continuous centrifugal separators $D_1$, $D_2$, $D_3$ and snubbers 24, 27, 30 are respectively provided in combination as illustrated in FIG. 2 to construct first through third separation means.

A tank 23 is a settling separator for separating coarse particles from a raw dispersion 21 supplied thereto, and is provided with a continuous centrifugal separator D1.

For example, the first ion-exchange treatment column 25 containing an OH-type anion-exchange resin and the second ion-exchange treatment column 28 containing an H-type cation-exchange resin are arranged in series, and a circulating circuit made up of return lines 216, 217 provided between adjacent separation means is used to make the flow rate of a dispersion to be treated to the ion-exchange resin greater, thereby permitting an effective ion-exchange treatment. Basic fine particles settled by treating with the OH-type anion-exchange resin and acidic fine particles settled by treating with the H-type cation-exchange resin can be obtained through an outlet 202 in the second separation means and an outlet 203 in the third separation means, respectively, in distinction from each other by their polarities.

An ultrafiltering means 31 is provided in the course of a line returned from the third separation means to the first separation means to ultrafilter at least part of the overflow stream from the third separation means. Its concentrate is returned to the third separation means, while its filtrate is taken out as a clear dispersion medium through an outlet 204. Besides, a secondary ion-exchange treatment column 33 containing a particulate ion-exchange resin having a polarity opposite to that of the ion-exchange resin in the second ion-exchange treatment column used in the main circuit is provided in the course of a circulating circuit through which a portion of the overflow stream from the third separation means is returned to the first separation means, whereby the ion-exchange treatment can be performed more efficiently. The thus-obtained dispersion medium can be taken out through an outlet 205.

Incidentally, although the apparatus provided with two ion-exchange resin columns, in which the ion-exchange resins different in polarity from each other are contained respectively, in the main circuit has been illustrated in FIG. 2, at least one combination of a separation means and an ion-exchange treatment column may be arranged further.

EMBODIMENTS OF THE INVENTION

The present invention will hereinafter be described more specifically by the following examples.

EXAMPLE 1

Preparation process of purified kaolin

Using an apparatus according to the present invention, as illustrated in FIG. 1, will hereinafter be described a process for subjecting a suspension of kaolin (an aqueous suspension having a concentration of 3 wt. %) to a cation-exchange treatment.

The first separation means arranged before an ion-exchange treatment column 5 for a purpose of removing coarse particles in the raw suspension 1 included a tank 3 having a circular form in section, a diameter of 2.65 m and a bottom area of 5.5 m². Its rate of level rise was 9 cm/hr as determined by introducing the raw suspension 1 at a rate of 0.5 m³/hr.

Fine particles having a settling velocity of 9 cm/hr do not overflow from the circular tank 3 so long as the depth of the tank is selected and a sufficient residence time is given thereto. This settling velocity corresponds to a Stokes diameter of about 6 μm at a water temperature of 10-15° C. Particles exceeding this size can be removed from the first separation means. When the tank 3 is provided with a continuous centrifugal separator D1 by which particles having the above-described Stokes diameter are caused to settle, the scale of the tank may be of the size of a mere centrifugal snubber.

The suspension taken out from the bottom of the tank was treated by a continuous centrifugal separator D1. The resultant light liquid was returned to a snubber 4. The resultant heavy medium was a cake-like concentrate containing about 60 wt. % of suspensoids, and could be taken out of the centrifugal separator. Since the proportion of particles greater than 6 μm in the concentrate was at least 5 times that in the original kaolin, these particles were mechanically ground to return to the first separation means 3.

In order to successfully stably conduct an ion-exchange treatment for 4 hours at a rate of 0.5 $m^3$/hr, a snubber 4 having a volume of 2 $m^3$ was provided, and a magnet pump having a capacity of 500 l/hr and a lift of 5 m was used as a pump $P_1$. The suspension was then introduced into a cation-exchange treatment column 5 containing particles of an H-type cation-exchange resin ("Duolite C20", trade name; product of Sumitomo Chemical Co., Ltd.) through a pressure hose. By this process, cations contained in the kaolin suspension were removed.

The second separation means arranged after the ion-exchange treatment column 5 includes a settling separator 6 having a height of 2 m and a sectional area of 1 $m^2$ and was provided with a snubber 7 having a volume of 2 $m^2$ along with a continuous centrifugal separator D2 so as to successfully stably conduct a further treatment for 4 hours at a rate of 0.5 $m^3$/hr.

When the raw suspension 1 is supplied automatically to a fixed level of the settling separator 3, the overflow stream from the settling separator 6 is returned to the snubber 4 through a return line 116, and the pumps are preset so as to automatically stop when the snubbers are dried up, the pumps $P_1$, $P_2$ can be caused to operate at all times. The overflow stream from the tank 6 was returned to the tank 3 and 4 through a line of the pump $P_2$ and a line of gravity-flow, respectively, to circulate it. As a result, settlings were produced as the pH of the suspension became lower by the cation-exchange treatment, so that the supernatant liquid in the tank 6 became clear. When the thus-obtained clean water was taken out through an outlet 106, an additional raw suspension 1 was supplied automatically.

If the clarity of the clean water is insufficient, it is ultrafiltered, so that it is possible to take water more purified out through a tank 9, a pump $P_6$ and an outlet 105.

By the way, if the raw suspension is thick, the supernatant liquid is treated in an anion-exchange treatment column 10 containing particles of an OH-type anion-exchange resin ("Duolite A101", trade name; product of Sumitomo Chemical Co., Ltd.), which has been arranged in the circulating circuit, whereby highly deionized water, from which both cations and anions have been removed, can be taken, as a developing water for diluting it to 2-3 wt. %, out through an outlet 104 through a tank 11 and a pump $P_5$. The thus-obtained water was returned to the tank 3 to use it for diluting the dispersion. By this process, anions contained in the kaolin can be removed. An effect to removing the anions is increased as the degree of dilution becomes higher.

A settled layer in the tank 6 was continuously centrifuged to recover a creamy concentrate containing about 40 wt. % of acidic suspensoids through an outlet 102, so that an acidic kaolin comprising only particles as small as 6 μm or less was obtained.

EXAMPLE 2

Treatment process of suspension effluent upon gravel washing

A suspension 1 effluent upon gravel washing was supplied into the tank 3, thereby recovering a coarse sand component through the outlet 101 of the continuous centrifugal separator D1 and a fine clay component through the outlet 102 of the continuous centrifugal separator D2. When the valve $V_3$ was opened to use the ultrafiltration, clear water was obtained through the outlet 104. The thus-obtained clear water was subjected further to the anion-exchange treatment, thereby obtaining deionized water through the outlet 104. The use of these water in washing of gravel resulted in the provision of sand highly deionized by the washing.

Needless to say, the object of washing is not limited to the gravel.

EXAMPLE 3

Purification process of iron oxide pigment

When a solution of iron chloride generated in ironworks is heated and calcined to recover hydrochloric acid, fine particles of iron oxide are formed.

These fine particles are often in the form of agglomerate and hence of no value the way things are going. The particles were dispersed in purified water to analyze the aqueous medium thereof. As a result, it was found that the chloride remained in a proportion of several thousands ppm in the particles. When fine particles little in chloride are intended to prepare, the cost increases in the heating and calcination of the solution. It is said that fine particles containing the chloride in a proportion less than 1,000 ppm can not be obtained under the existing circumstances.

Fine particles of iron oxide containing the chloride in a proportion of 1,000 ppm were added with deionized water into a 40 wt. % suspension 1. The suspension was supplied into the tank 3 of the ion-exchange treatment apparatus 5 illustrated in FIG. 1. An anion-exchange resin ("Duolite A101", trade name; product of Sumitomo Chemical Co., Ltd.) and a cation-exchange resin ("Duolite C20", trade name; product of Sumitomo Chemical Co., Ltd.) were fill in the primary ion-exchange treatment column 5 and the secondary ion-exchange resin column 10, respectively. The suspension was diluted to a concentration of 3 wt. % to develop it at a flow rate of 1 $m^3$/hr. Coarse particles greater than 1 μm were removed through the outlet 101 of the centrifugal separator D1. A 40 wt. % suspension containing fine particles not greater than 1 μm was recovered through the outlet 102 of the continuous centrifugal separator D2. The thus-recovered suspension was dried by spray drying, thereby obtaining fine particles of purified iron oxide. The content of the chloride in this product was 43 ppm. Namely, it was possible to practice the deionization and washing of the pigment.

EXAMPLE 4

High purification process of iron oxide pigment

In the apparatus illustrated in FIG. 2, two primary ion-exchange treatment columns similar to that in the apparatus shown in FIG. 1 are arranged in series. First and second columns 25, 28 were filled with a cation-exchange resin ("Duolite C20", trade name; product of Sumitomo Chemical Co., Ltd.) and an anion-exchange resin ("Duolite A101", trade name; product of Sumitomo Chemical Co., Ltd.), respectively. For the secondary ion-exchange treatment column 33 provided in the circulating circuit, the cation-exchange resin ("Duolite C20", trade name; product of Sumitomo Chemical Co., Ltd.) was used.

Fine particles of iron oxide containing the chloride in a proportion of 1,000 ppm were added with deionized water into a 40 wt. % suspension 1. The suspension 1 was supplied into the tank 23 of the ion-exchange treatment apparatus illustrated in FIG. 2. The suspension was diluted to a concentration of 3 wt. % to develop it at a flow rate of 1 m$^3$/hr. Coarse particles greater than 1 $\mu$m were removed through the outlet 201 of the continuous centrifugal separator D1. Acidic fine particles not greater than 1 $\mu$m were able to be recovered as a 40 wt. % slurry through the outlet 202 of the continuous centrifugal separator D2, but the amount thereof was slight.

A great amount of fine particles not greater than 1 $\mu$m were able to be recovered as a 40 wt. % slurry through the outlet 203 of the continuous centrifugal separator D3. These fine particles were apparently neutral and contained the chloride and silicate ions at concentrations as extremely low as 13 ppm and 14 ppm, respectively. By arranging in series the removing means for cations before the removing means for anions, it was possible to practice the deionization to a very high degree.

Incidentally, when a desired number of combinations of the separation means and the cation-exchange treatment column with the separation means and the anion-exchange treatment column are further arranged in the main circuit to construct a series circuit, it is possible to perform the deionization treatment to a higher degree.

EXAMPLE 5

Electrodeposition coating

Conventional process

Figure 5:
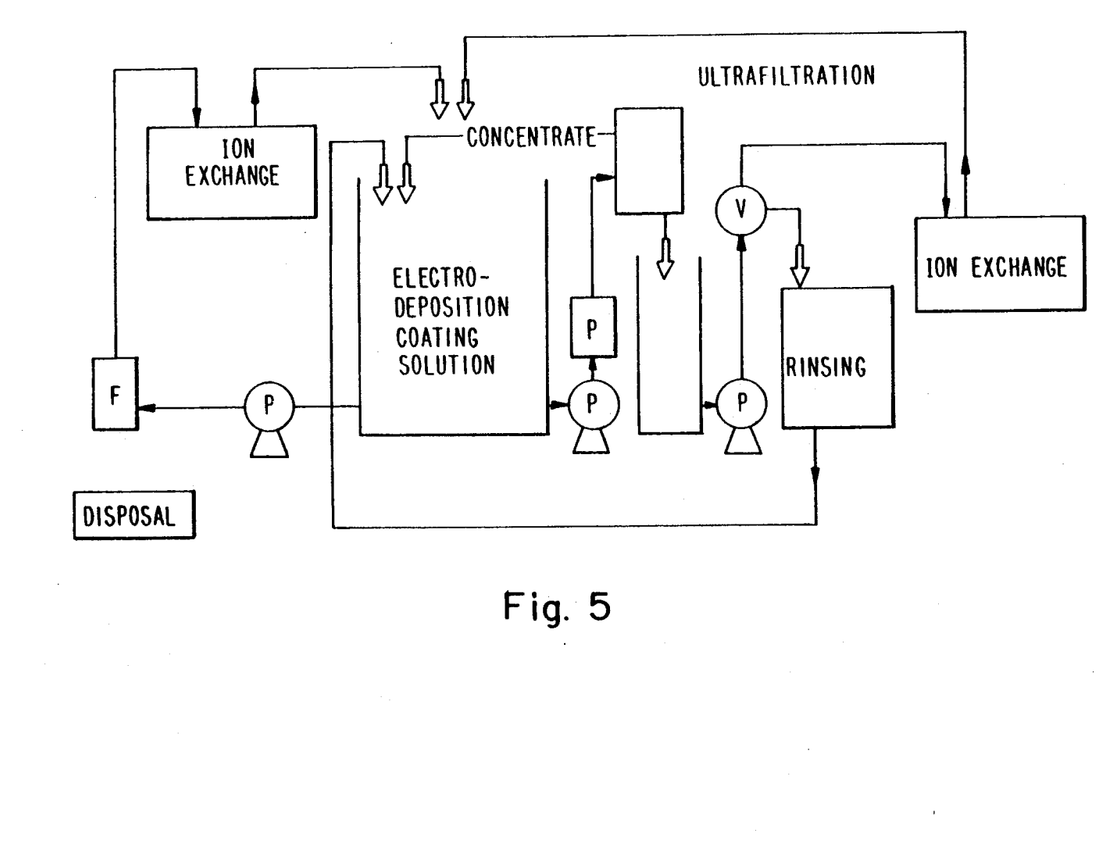
FIG. 5 is a flow chart illustrating a conventional electrodeposition coating process.

In FIG. 5, there is shown a flow chart illustrating a conventional purification process of an electrodeposition coating solution. According to this process, an excess paint deposited to an article can be recovered without discharging it outside the coating system by using, as a rinse for rinsing the article subjected to the electrodeposition coating, a filtrate obtained by ultrafiltering the electrodeposition coating solution, and returning rinsings after the rinsing to the original electrodeposition coating solution. In the case of a cationic electrodeposition coating, the electrodeposition coating solution is easy to ultrafilter as its pH becomes lower. However, its coating performance is reduced. It is therefore only possible to ultrafilter in a limited pH range, so that only a particular filtration membrane cartridge can be used. Since clogging still occurs, an operating pressure is raised, resulting in easy breakage in filtration membrane. Since the anticorrosive function of the coating film is reduced as Na ions accumulate, it is necessary to remove the Na ions. In the conventional electrodeposition coating apparatus, the ultrafiltrate is discharged gradually. This discharging becomes steady, whereby the electrodeposition coating seems to be stably operated to all appearances.

The discharging of the ultrafiltrate is an epochal method as a purification means for colloids, and an important technique in electrodeposition coating. Since active principles such as an organic solvent are also discharged, it is however necessary to periodically supplement them. Although in the case where the rinsings effluent from the final stage of the electrodeposition coating process are discharged, its BOD and/or COD can be reduced in a usual equipment by diluting it, the ultrafiltrate itself is incinerated together with a great amount of water due to its high BOD and/or COD value. Therefore, the treatment cost thereof also becomes expensive. Although it is faultless to ion-exchange the ultrafiltrate, arrangements for ultrafiltration must be established due to the ion-exchange treatment and moreover, arrangements for discharging the rinsings of the ultrafiltrate and treating them as general water must also be established. The burden on these establishment is heavy. Namely, it is preferable to ion-exchange the electro-deposition coating solution itself. An ion-exchange treatment can be applied to so-called clear coatings free of any pigments, but hardly applied to electro-coating paints containing at least one pigments.

With respect to pigments, fine particles not greater than 1 $\mu$m like titanium oxide may be used as a white paint. When it is desired to apply an coating of a delicate feel, as called iridescent luster, silky gloss or luster coating, in addition to a simple white color in coating appearance, it is attempted to use pigments of several microns, which have respective characteristic forms, for example, mica, mica-like pigments, sericite, etc. These primary particles do not form a cause of clogging in ion-exchange treatment or the like, but they agglomerate by various causes in electro-deposition coating. The ion-exchange treatment can not be performed unless these agglomerates are removed. In the conventional filter, its renewal cost runs up, so that the use of the filter is practiced only in limited fields. The cause by which the agglomerates are formed has not been made very clear. In the case of an anionic electro-coating paint, there is an action of divalent metal ions generated by anodic dissolution. It is therefore necessary to remove anions. However, there is no means for removing the anions to an amount as small as several tens ppm.

Cationic electrodeposition coating which is not directly affected by such an anodic dissolution exhibits a particular effect in a certain respect in anticorrosive coating. Even in the cationic electrodeposition coating, the anode material of the equipment dissolves out when many chloride ions are present, resulting in indirect abnormality. In such a case, the countermeasure requires more circumspection.

For example, in the cationic electro-coating paint, chloride ions remaining in an epoxy resin by way of example are reacted with lead acetate to form fine particles of insoluble lead chloride, thereby incorporating them into an electrodeposition film, or are removed through filters installed in various places of a electrodeposition coating equipment. In this method, the renewal cost of the filters runs up, or lead chloride deposits as coarse particles not smaller than 10 $\mu$m at the time the temperature of the coating solution falls in a holiday, so that the coat appearance of the electrodeposition film having a thickness of 10–20 μm is impaired. To remove such coarse particles is also an important technique in the electrodeposition coating.

Electrodeposition coating process making use of the apparatus according to the invention Into the tank 3 of the apparatus according to the present invention as shown in FIG. 1, was supplied a 15 wt. % electro-deposition coating solution having a pH of 6.5 and an electrical conductivity of 985 μS/cm. Various kinds of coarse agglomerates greater than 6 μm, including the above-described lead chloride were removed in the continuous centrifugal separator D1. Fine particles not greater than 6 μm easily passed through the interparticles of a cation-exchange resin ("Duolite C20", trade name; product of Sumitomo Chemical Co., Ltd.) having a particle size of several millimeters, so that the solution was cation-exchanged without clogging to be led to the tank 6.

Since the solution was returned from the tank 6 to the tank 4 as an overflow stream, the treatment can be done at speed as high as possible. Useless monovalent Na ions could be selectively removed from useful divalent lead ions in the cationic electro-coating paint, so that the pH of the coating solution was slightly lowered to 6.2 and hence, the cationic electrodeposition coating solution became a more stably dispersed state. This hence made cares of flocculation and clogging unnecessary. The thus-treated solution was subjected to ultrafiltration through the pump $P_2$ and the valve $V_3$. As a result, it was possible to ultrafilter it extremely smoothly compared with the ultrafiltration of the raw coating solution not subjected to the treatment according to this invention. Upon the conventional ultrafiltration, it has been possible to adjust the pH of the solution only by adding acetic acid thereto. According to the process of this invention, a rinse could be obtained in a great amount, so that it was also able to rinse openings of complicated structures in automobile bodies extremely smoothly, resulting in significant reduction in occurrence of rust caused by corrosive ions remaining in these parts.

When the ultrafiltrate treated further with an anion-exchange resin ("Duolite A101", trade name; product of Sumitomo Chemical Co., Ltd.) in the ion-exchange treatment column 10 arranged in the circulating circuit, the pH of said ultrafiltrate being slightly raised to 6.9, was used as a rinse, it was possible to more effectively rinse articles subjected to the electrodeposition coating. When the pH of the filtrate taken out through the outlet 105 was too low to use it as a rinse as it is, there was a possible trouble that the surface of the electrodeposition film dissolves out in the rinse. There was however no occurrence of such a trouble when the filtrate taken out through the outlet 104 was used as a rinse. In any event, since the filtrate is returned to the origin, the chemical mass balance becomes a closed system. Since the anion-exchange treatment could be incorporated therein, it was possible to keep the pH of the electrodeposition coating solution always constant even when a diaphragm said to be essential for the electrodeposition coating was not used, and hence to perform extremely good electrodeposition coating.

The basic patent of electrodeposition coating comprises techniques relating to pH control and can be roughly divided into (1) a technique for formulating a supply paint, which is called a "feed process"; (2) an electrodialysis technique which is called a "diaphragm process"; and (3) an ion-exchange treatment technique which called a "cation-exchange process". According to the present invention in the third process, an effect exceeding those in the first and second processes could be exhibited.

According to the present invention, the equipments for electrodeposition coating can be widely reduced, and potential drop due to the diaphragm does not occur, so that a marked effect to reduce the costs of equipment and electric power accompanied by the potential drop is also brought about. When the reproduction of ion-exchange resins is effected concentrically at a different place to provide the ion-exchange resins thus reproduced to the scene of electrodeposition coating by cartridges, a high level of maintenance can be practiced with extreme ease. Therefore, everybody has come to be able to practice electrodeposition coating without possessing any large effluent treatment apparatus.

What is claimed is:

1. An ion-exchange treatment apparatus for dispersions, which comprises (1) a main circuit including (a) a first separation means for separating coarse particles among dispersoids from a raw dispersion suppled thereto, (b) an ion-exchange treatment column containing a particulate ion-exchange resin having a single polarity, (c) a second separation means for separating the remaining dispersoids from the dispersion subjected to the ion-exchange treatment and (d) a flow path line for causing the means (a), (b) and (c) to communicate in series, and (2) a circulating circuit for returning at least part of the dispersion treated in the second separation means (c) to the first separation means (a); wherein the first and second separation means are settling separators.

2. The ion-exchange treatment apparatus as claimed in claim 1, wherein the first and second settling separators are provided with respective continuous centrifugal separators.

3. The ion-exchange treatment apparatus as claimed in claim 1, wherein dispersoids corresponding to a Stokes diameter greater than 10 μm, preferably 6 μm, which form a cause of clogging in an ion-exchange treatment column, are separated and removed in the first separation means.

4. The ion-exchange treatment apparatus as claimed in claim 1, wherein the ion-exchange treatment column is filled with an H-type cation-exchange resin or an OH-type anion-exchange resin, whereby acidic fine particles in dispersoids, which are settled by treating with the H-type cation-exchange resin, or basic fine particles in the dispersoids, which are settled by treating with the OH-type anion-exchange resin, are collected in and recovered from the second separation means.

5. The ion-exchange treatment apparatus as claimed in claim 1, wherein the circulating circuit includes further an ultrafiltering means which serves to ultrafilter at least part of the overflow stream from the second separation means, whereby the concentrate is returned to the second separation means and the ultrafiltrate is taken out as a clean dispersion medium.

6. The ion-exchange treatment apparatus as claimed in claim 1, wherein a secondary ion-exchange treatment column containing a particulate ion-exchange resin having a polarity opposite to that of the ion-exchange resin in the ion-exchange treatment column used in the main circuit is provided in the course of the circulating circuit, whereby deionized dispersion medium can be taken out therefrom.

7. The ion-exchange treatment apparatus as claimed in claim 6, wherein the filtrate obtained by ultrafiltering the overflow stream from the second separation means through the ultrafiltering means is subjected to an ion-exchange treatment in the secondary ion-exchange treatment column.

8. The ion-exchange treatment apparatus as claimed in claim 1, wherein at least one combination of a separation means and an ion-exchange treatment column containing a particulate ion-exchange resin having a single polarity is arranged further between the ion-exchange treatment column (b) and the second separation means (c) of the main circuit so as to communicate in series by a flow path line, and return lines are provided between adjacent separation means.

9. An ion-exchange treatment apparatus for dispersions, which comprises (I) a main circuit including (A) a first separation means for separating coarse particles among dispersoids from a raw dispersion supplied thereto, (B) a first ion-exchange treatment column containing a particulate ion-exchange resin having a single polarity therein, (C) a second separation means for separating certain dispersoids from the dispersion subjected to the ion-exchange treatment in the first ion-exchange treatment column (B), (D) a second ion-exchange treatment column containing a particulate ion-exchange resin having a polarity opposite to that of the ion-exchange resin in the first column (B), (E) a third separation means for separating the remaining dispersoids from the dispersion subjected to the ion-exchange treatment in the second ion-exchange treatment column (D) and (F) a flow path line for causing the means (A), (B), (C), (D) and (E) to communicate in series, and (II) a circulating circuit for returning at least part of the dispersion treated in the third separation means (E) to the first separation means (A); wherein the first, second, and third separation means are settling separators.

10. The ion-exchange treatment apparatus as claimed in claim 9, wherein the first, second, and third settling separators are provided with respective continuous centrifugal separators.

11. The ion-exchange treatment apparatus as claimed in claim 9, wherein dispersoids corresponding to a Stokes diameter greater than 10 $\mu$m, preferably 6 $\mu$m, which form a cause of clogging in an ion-exchange treatment column, are separated and removed in the first separation means.

12. The ion-exchange treatment apparatus as claimed in claim 9, wherein one of the ion-exchange treatment columns (B) and (D) arranged in series is filled with an OH-type anion-exchange resin and the other column is filled with an H-type cation-exchange resin, whereby acidic fine particles in dispersoids, which are settled by treating with the H-type cation-exchange resin, and basic fine particles in the dispersoids, which are settled by treating with the OH-type anion-exchange resin, are respectively collected in and recovered from the separation means subsequent to their corresponding columns.

13. The ion-exchange treatment apparatus as claimed in claim 9, wherein the circulating circuit includes further an ultrafiltering means which serves to ultrafilter at least part of the overflow stream from the third separation means, whereby the concentrate is returned to the third separation means and the ultrafiltrate is taken out as a clean dispersion medium.

14. The ion-exchange treatment apparatus as claimed in claim 9, wherein a secondary ion-exchange treatment column (G) containing a particulate ion-exchange resin having a polarity opposite to that of the ion-exchange resin in the second ion-exchange treatment column (D) used in the main circuit is provided in the course of the circulating circuit through which a portion of the overflow stream from the second separation means is returned to the first separation means, whereby deionized dispersion medium can be taken out therefrom.

15. The ion-exchange treatment apparatus as claimed in claim 14, wherein the filtrate obtained by ultrafiltering the overflow stream from the third separation means (E) through the ultrafiltering means is subjected to an ion-exchange treatment in the secondary ion-exchange treatment column.

16. The ion-exchange treatment apparatus as claimed in claim 9, wherein at least one combination of a separation means and an ion-exchange treatment column containing a particulate ion-exchange resin having a single polarity is arranged further between the second ion-exchange treatment column (D) and the third separation means (E) of the main circuit so as to communicate in series by a flow path line, and return lines are provided between adjacent separation means.

* * * * *